(12) United States Patent
Gervais et al.

(10) Patent No.: US 10,575,459 B2
(45) Date of Patent: Mar. 3, 2020

(54) PRODUCT DISTRIBUTION CONTROL SYSTEM FOR AN AGRICULTURAL SYSTEM

(71) Applicant: CNH Industrial Canada, Ltd., Saskatoon (CA)

(72) Inventors: Joel John Octave Gervais, Saskatoon (CA); James Wayne Henry, Saskatoon (CA); Scott David Noble, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 281 days.

(21) Appl. No.: 15/640,860

(22) Filed: Jul. 3, 2017

(65) Prior Publication Data
US 2019/0000011 A1    Jan. 3, 2019

(51) Int. Cl.
*A01C 7/16*    (2006.01)
*A01C 21/00*   (2006.01)
(Continued)

(52) U.S. Cl.
CPC ............ *A01C 21/005* (2013.01); *A01C 5/064* (2013.01); *A01C 5/068* (2013.01); *A01C 7/082* (2013.01);
(Continued)

(58) Field of Classification Search
CPC ....... A01C 21/005; A01C 7/081; A01C 7/102; A01C 5/064; A01C 5/068; A01C 7/082; A01C 7/163; A01C 7/206; A01C 15/006
(Continued)

(56) References Cited

U.S. PATENT DOCUMENTS

| | | |
|---|---|---|
| 4,085,862 A | 4/1978 | Steffen |
| 4,159,064 A | 6/1979 | Hood |

(Continued)

FOREIGN PATENT DOCUMENTS

| | | |
|---|---|---|
| CA | 2804569 | 9/2014 |
| FR | 2790184 | 9/2000 |

OTHER PUBLICATIONS

Tola et al, Granular Fertiliser Application Rate Control System with Integrated Output Volume Measurement, 2008, Graduate School of Agriculture, Hokkaido University, JP.
(Continued)

*Primary Examiner* — Thomas G Black
*Assistant Examiner* — Wae L Louie
(74) *Attorney, Agent, or Firm* — Rebecca L. Henkel; Rickard K. DeMille

(57) ABSTRACT

A product distribution control system for an agricultural system includes a controller having a memory and a processor. The controller is configured to receive a first signal indicative of a prescription map. The controller is further configured to determine a first parameter associated with operation of an air cart of the agricultural system based at least in part on the prescription map. The controller is further configured to determine at least one of a second parameter associated with operation of a work vehicle of the agricultural system based at least in part on the prescription map, and a third parameter associated with an implement of the agricultural system based at least in part on the prescription map, wherein the implement includes one or more row units. The controller is further configured to output, in response to determining the first parameter, a second signal indicative of an instruction to control a first element of the air cart based at least in part on the first parameter, output, in response to determining the second parameter, a third signal indicative
(Continued)

of an instruction to control a second element of the work vehicle based at least in part on the second parameter, and output, in response to determining the third parameter, a fourth signal indicative of an instruction to control a third element of the implement based at least in part on the third parameter.

20 Claims, 8 Drawing Sheets

(51) Int. Cl.
    *A01C 7/20*     (2006.01)
    *A01C 5/06*     (2006.01)
    *A01C 15/00*     (2006.01)
    *A01C 7/08*     (2006.01)

(52) U.S. Cl.
    CPC .............. *A01C 7/163* (2013.01); *A01C 7/206* (2013.01); *A01C 15/006* (2013.01)

(58) Field of Classification Search
    USPC .......................................................... 701/50
    See application file for complete search history.

(56) References Cited

U.S. PATENT DOCUMENTS

| | | |
|---|---|---|
| 4,491,241 A | 1/1985 | Knepler et al. |
| 5,177,470 A | 1/1993 | Repas |
| 5,913,369 A | 6/1999 | Bodie et al. |
| 5,956,255 A | 9/1999 | Flamme |
| 6,024,035 A | 2/2000 | Flamme |
| 6,070,538 A | 6/2000 | Flamme et al. |
| 6,192,813 B1 | 2/2001 | Memory et al. |
| 6,584,920 B1 | 7/2003 | Cresswell |
| 7,450,019 B1 | 11/2008 | Spain |
| 8,408,478 B2 | 4/2013 | Wonderlich |
| 8,504,310 B2 | 8/2013 | Landphair et al. |
| 2012/0227647 A1 | 9/2012 | Gelinske et al. |
| 2013/0061790 A1 | 3/2013 | Binsirawanich et al. |
| 2013/0085598 A1* | 4/2013 | Kowalchuk ............ A01C 7/081 700/231 |
| 2013/0233088 A1 | 9/2013 | Noble et al. |
| 2016/0120097 A1* | 5/2016 | Chahley ............... G05D 7/0617 701/50 |
| 2017/0055436 A1* | 3/2017 | Thompson ............. A01C 7/102 |
| 2017/0055437 A1* | 3/2017 | Thompson ............. A01C 7/102 |
| 2017/0094894 A1 | 4/2017 | Heim et al. |

OTHER PUBLICATIONS

AG Leader Technology, Air Seeder Cart Support, Product Catalog, 2014, 1-12, AG Leader Technology, US.

Versatile, AC Series Air Cart, Product Catalog, 2014, 1-2, Versatile, US.

\* cited by examiner

PRODUCT DISTRIBUTION CONTROL SYSTEM FOR AN AGRICULTURAL SYSTEM

BACKGROUND

The disclosure relates generally to a product distribution control system for an agricultural system.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a target depth beneath the soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other agricultural products (e.g., fertilizer) into the trench. The opener/seed tube may be followed by closing discs that move displaced soil back into the trench and/or a packer wheel that packs the soil on top of the deposited seeds.

In certain configurations, an air cart is used to meter and deliver agricultural product (e.g., seeds, fertilizer, etc.) to the row units of the seeding implement. The air cart generally includes a storage tank (e.g., a pressurized tank), an air source (e.g., a blower), and a metering system. The product is typically gravity fed from the storage tank to the metering system which distributes a target volume of product into an air flow generated by the air source. The air flow carries the product to the row units via conduits extending between the air cart and the seeding implement. The metering system typically includes meter rollers that regulate the flow of product based on meter roller geometry and rotation rate.

Distribution and application of agricultural product (e.g., seeds fertilizer, etc.) may be controlled through adjustment of various operating settings of the air cart, implement, and/or work vehicle of the agricultural system. Operator control of the various operating settings to meet a target product distribution throughout a field may increase the work load of the operator of the agricultural system. In addition, distribution of the agricultural product may not match a prescription map or target product density throughout the field, which in turn may reduce yields.

BRIEF DESCRIPTION

In one embodiment, a product distribution control system for an agricultural system includes a controller having a memory and a processor. The controller is configured to receive a first signal indicative of a prescription map. The controller is further configured to determine a first parameter associated with operation of an air cart of the agricultural system based at least in part on the prescription map. The controller is further configured to determine at least one of a second parameter associated with operation of a work vehicle of the agricultural system based at least in part on the prescription map, and a third parameter associated with an implement of the agricultural system based at least in part on the prescription map, wherein the implement includes one or more row units. The controller is further configured to output, in response to determining the first parameter, a second signal indicative of an instruction to control a first element of the air cart based at least in part on the first parameter, output, in response to determining the second parameter, a third signal indicative of an instruction to control a second element of the work vehicle based at least in part on the second parameter, and output, in response to determining the third parameter, a fourth signal indicative of an instruction to control a third element of the implement based at least in part on the third parameter.

In another embodiment, a method of controlling a product distribution system for an agricultural system includes receiving a first signal indicative of a prescription map. The method includes determining a first parameter associated with operation of an air cart of the agricultural system based at least in part on the prescription map. The method further includes determining at least one of a second parameter associated with operation of a work vehicle of the agricultural system based at least in part on the prescription map, and a third parameter associated with operation of an implement of the agricultural system based at least in part on the prescription map, wherein the implement includes one or more row units. The method further includes outputting, in response to determining the first parameter, a second signal indicative of an instruction to control a first element of the air cart based at least in part on the first parameter, outputting, in response to determining the second parameter, a third signal indicative of an instruction to control a second element of the work vehicle based at least in part on the second parameter, and outputting, in response to determining the third parameter, a fourth signal indicative of an instruction to control a third element of the implement based at least in part on the third parameter.

In a further embodiment, a tangible, non-transitory, and computer-readable medium having instructions stored thereon that, when executed by a processor, are configured to cause the processor to receive a first signal indicative of a prescription map. The instructions cause the processor to determine a first parameter associated with operation of an air cart of the agricultural system based at least in part on the prescription map, wherein the first parameter includes an air flow rate within the air cart or a meter rate of a product flow system of the air cart. The instructions cause the processor to determine at least one of a second parameter associated with operation of a work vehicle of the agricultural system based at least in part on the prescription map, and a third parameter associated with operation of an implement of the agricultural system based at least in part on the prescription map, wherein the implement comprises one or more row units. The instructions further cause the processor to output, in response to determining the first signal, a second signal indicative of an instruction to control a first element of the air cart based at least in part on the first parameter, output, in response to determining the second parameter, a third signal indicative of an instruction to control a second element of the work vehicle based at least in part on the second parameter, and output, in response to determining the third parameter, a fourth signal indicative of an instruction to control a third element of the implement based at least in part on the third parameter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
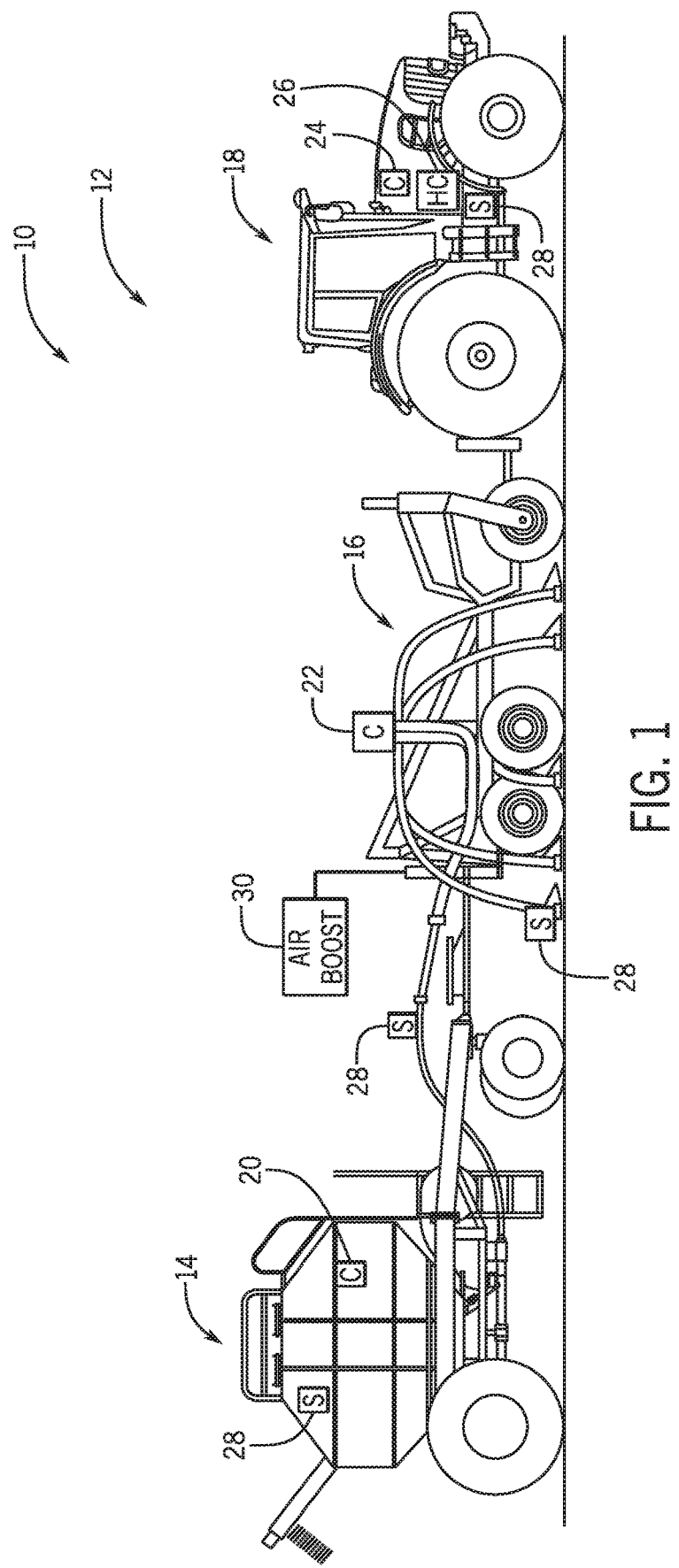
FIG. 1 is a schematic view of an embodiment of an agricultural system having a product distribution control system.

Turning now to the drawings, FIG. 1 is a schematic view of an embodiment of an agricultural system 10 having a product distribution control system 12. The agricultural system 10 includes an air cart 14, an implement 16, and a work vehicle 18 (e.g., tractor). The work vehicle 18 is coupled to the implement 16 and used to tow the air cart 14 and the implement 16. The air cart 16 is coupled to the implement 16 and is employed to distribute agricultural product (e.g., seeds, fertilizer, etc.) to the implement 16 using a blower, such as a fan, and a metering system, which may include a series of meter rollers.

The air cart controller 20 may be configured to receive a prescription map indicative of a target distribution of the agricultural product throughout a field. Distribution of the agricultural product may be controlled by the product distribution control system 12 of the agricultural system 10. The product distribution control system 12 may include one or more controllers and sensors 28 disposed throughout the agricultural system 10. The air cart 14 of the agricultural system 10 includes the air cart controller 20 communicatively coupled to the one or more sensors 28 of the product distribution control system 12. The air cart controller 20 may include a memory and a processor. The air cart controller 20 may be the main controller of the product distribution control system 12, and thus may receive input from various sensors 28 throughout the agricultural system 10. The air cart controller 20 may send output signals to various components of the air cart 14, the implement 16, or the work vehicle 18, an implement controller 22, a work vehicle controller 24, a hydraulics controller 26, or a combination thereof to control various operation settings based at least in part on the prescription map and the input signals received from the sensors 28 throughout the agricultural system 10.

The product distribution control system 12 may include any suitable number of sensors (e.g., 1, 2, 3, 4, 5, or more) disposed at various locations on the agricultural system 10. The sensors are communicatively coupled to and configured to send signals to the air cart controller 20 and/or a controller on each respective component of the agricultural system 10, such as the implement controller 22 and the work vehicle controller 24. The one or more sensors 28 may communicate wirelessly with the controllers of the product distribution control system 12, however wired control circuitry may be included. The one or more sensors 28 may send signals to the air cart controller 20 (e.g., via the implement controller and/or the work vehicle controller) indicative of various conditions or parameters related to operation of the agricultural system 10 and/or environmental conditions, such as soil conditions and atmosphere conditions. In some embodiments, the air cart controller 20 may be communicatively coupled to the controller 22 of the implement 16, the controller 24 of the work vehicle, the hydraulics controller 26, or a combination thereof. The air cart controller 20 may output signals to these controllers to control various operational settings on the respective components of the agricultural system 10. In some embodiments, the implement controller 22 or the work vehicle controller 24 may be the controller that outputs signals to the other controllers of the product distribution control system 12, or the product distribution control system 12 may include only one controller. Control of various operational settings or elements and components of the agricultural system 10 may enable more accurate and efficient distribution of the agricultural product from the agricultural system 10.

Figure 2:
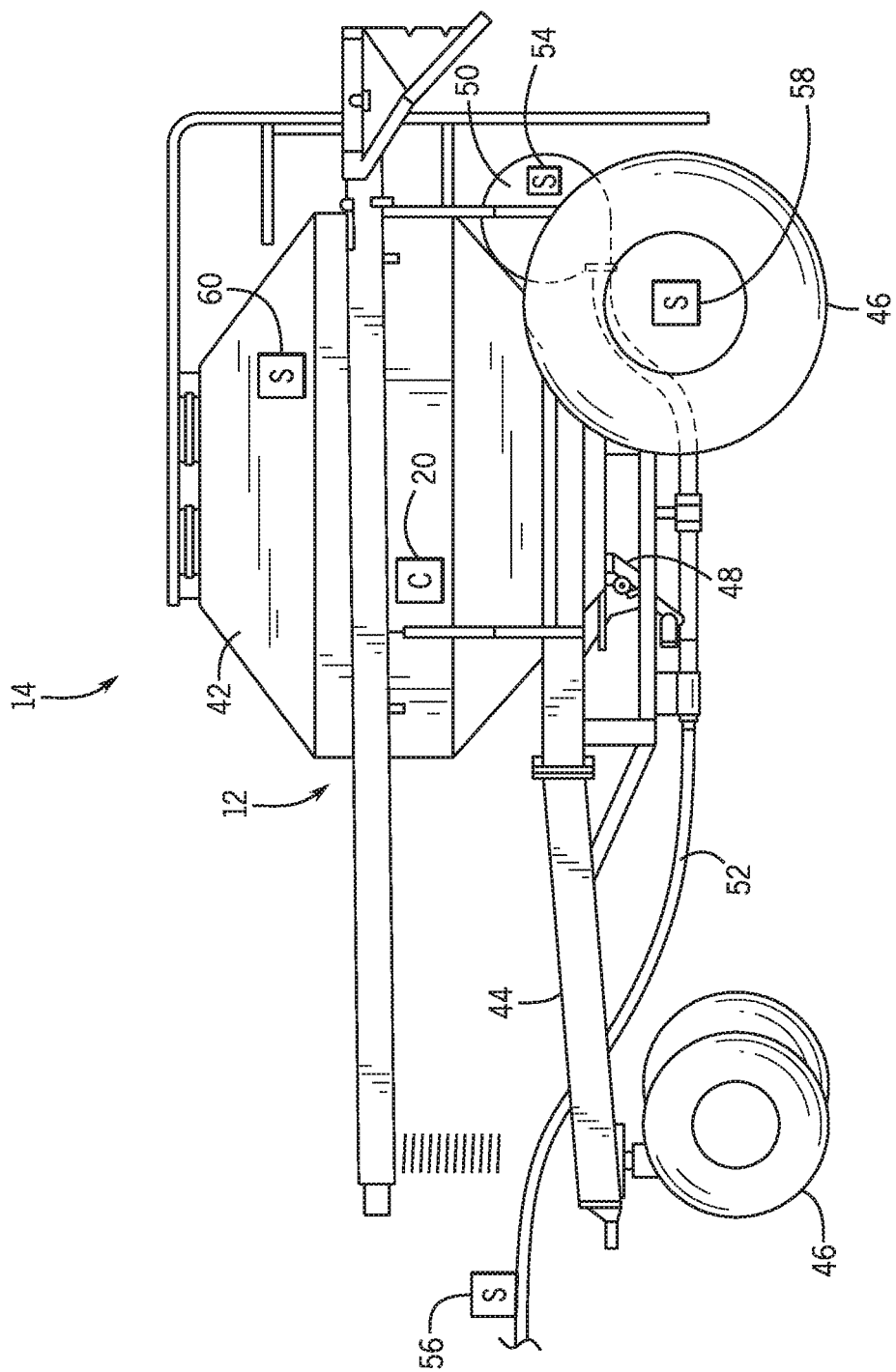
FIG. 2 is a side view of an embodiment of an air cart that may be used in the agricultural system of FIG. 1, in accordance with an embodiment of the present disclosure.

FIG. 2 is a side view of an embodiment of an air cart 14 that may be used in conjunction with the towable implement to deposit seeds into the soil. For example, certain implements include row units each configured to open the soil, dispense seeds into the soil opening, and re-close the soil. Such implements are generally coupled to a tow vehicle, such as a tractor, and pulled through a field. In certain configurations, seeds are conveyed to the row units by the air cart 14, which is generally towed in sequence with the implement. However, in certain configurations the air cart 14 may be in front of the implement. In certain configurations, the air cart 14 may be configured to provide fertilizer to the row units, or a combination of seeds and fertilizer.

In the illustrated embodiment, the air cart 14 includes a storage tank 42, a frame 44, wheels 46, a metering system 48, and an air source 50. In certain configurations, the storage tank 42 includes multiple compartments for storing various flowable product materials. For example, one compartment may include seeds, such as canola or mustard, and another compartment may include a dry fertilizer. In such configurations, the air cart 14 is configured to delivery both the seeds and fertilizer to the implement. The frame 44 includes a towing hitch configured to couple to the implement or tow vehicle. As discussed in detail below, seeds and/or fertilizer within the storage tank 42 are gravity fed into the metering system 48. The metering system 48 includes one or more meter rollers that regulate the flow of material from the storage tank 42 into an air flow provided by the air source 50. The air flow then carries the material to the implement by pneumatic conduits 52. In this manner, the row units of the implement receive a supply of seeds and/or fertilizer for deposition within the soil.

The air cart 14 includes the air cart controller 20 as part of the product distribution control system 12 of the agricultural system 10. The air cart controller 20 may be disposed at various locations on the air cart 14. The air cart 14 may include one or more sensors 28 that may be disposed at various locations about the air cart 14. The one or more sensors 28 may be configured to monitor various operational parameters related to the air cart 14 and/or environmental conditions related to the operation of the agricultural system 10. For example, as shown in the illustrated embodiment, the air cart 14 includes an air flow sensor(s) 54 that monitors air flow characteristics from the air source 50 (e.g. fan) of the air cart 14. The air flow sensor(s) 54 may be located adjacent to the air source 50, or at any other location suitable for determining air flow characteristics of the air cart 14. The air flow sensor(s) 54 may monitor such measurements as the air flow rate, static air pressure, dynamic air pressure, the air flow velocity of the air from the air source 50, or a combination thereof. The air flow sensor(s) 54 may output a signal or signals to the air cart controller 20 indicative of such air flow characteristics. The air cart controller 20 may utilize the signal(s) received from the air flow sensor(s) 54 of the air cart 14 as an input to determine a target product flow rate or other target parameters of the agricultural system 10 and/or as feedback.

Further, the air cart 14 includes a particle flow sensor(s) 56 that may be located along the pneumatic conduits 52 (e.g., one flow sensor per conduit) that carry the seeds and/or fertilizer from the air cart 14 to the implement 16, or at any location on the air cart 14 suitable for monitoring product flow characteristics from a product flow system of the air cart. The particle flow sensor(s) 56 may determine product flow characteristics, such as a product flow rate and/or a product flow velocity. The particle flow sensor(s) 56 may output a signal or signals to the air cart controller 20 indicative of the product flow characteristics of the air cart 14. The air cart 14 includes a soil sensor 58 that may monitor soil conditions, such as the soil type, the soil residue, and/or the soil moisture content. The soil sensor 58 may be located at any location on the air cart suitable for determining soil conditions. Alternatively, the soil sensor 58 may be located on the implement, on the work vehicle, or at a location in the field that is not directly disposed on the agricultural system 10. The soil sensor 58 may output a signal or signals to the air cart controller 20 indicative of the determined soil conditions. The air cart 14 includes an atmosphere sensor 60 that may determine atmosphere conditions, such as the ambient temperature, humidity, atmospheric pressure, or a combination thereof. The atmosphere sensor 60 may be located at any position on the air cart 14 suitable for determining atmosphere conditions. Alternatively, the atmosphere sensor 60 may be located on the implement, on the work vehicle, or at a location in the field that is not directly disposed on the agricultural system 10. The atmosphere sensor 60 may output a signal or signals to the air cart controller 20 indicative of the determined atmosphere conditions.

The air cart may include all of, or any combination of, the above described sensors, or any other sensors, that may send signals to the air cart controller 20. The air cart controller 20 may receive signal(s) from the air flow sensor, the flow sensor, the soil sensor, the atmosphere sensor of the air cart 14, or a combination thereof. The air cart controller 20 may utilize these signals as inputs to determine a target product flow rate, target air flow rate, target speed, target penetration depth, or a combination thereof and/or as feedback into the product distribution control system 12 (e.g., once output signals from the air cart controller 20 have been output to control various components of the agricultural system 10), as discussed in more detail with reference to FIG. 7. Further, the air cart controller 20 may utilize the signal(s) from the flow sensor(s) (e.g., air flow sensors and flow sensors monitoring product flow) to detect and predict plugging in the agricultural system. Air flow from the air cart may be controlled via valves or vanes in the air distribution system (e.g., air source 50 and conduits 52) or plenum. Additionally or alternatively, air flow from the air cart may be controlled by adjusting the hydraulic flow to the fan, thereby changing the fan speed. Further the air flow for each conduit 52 may be controlled individually, and the air flow in one conduit 52 may affect the air flow in other conduits 52. Individual product flow may be controlled via valve in the product distribution system (e.g., metering system and conduits 52).

Figure 3:
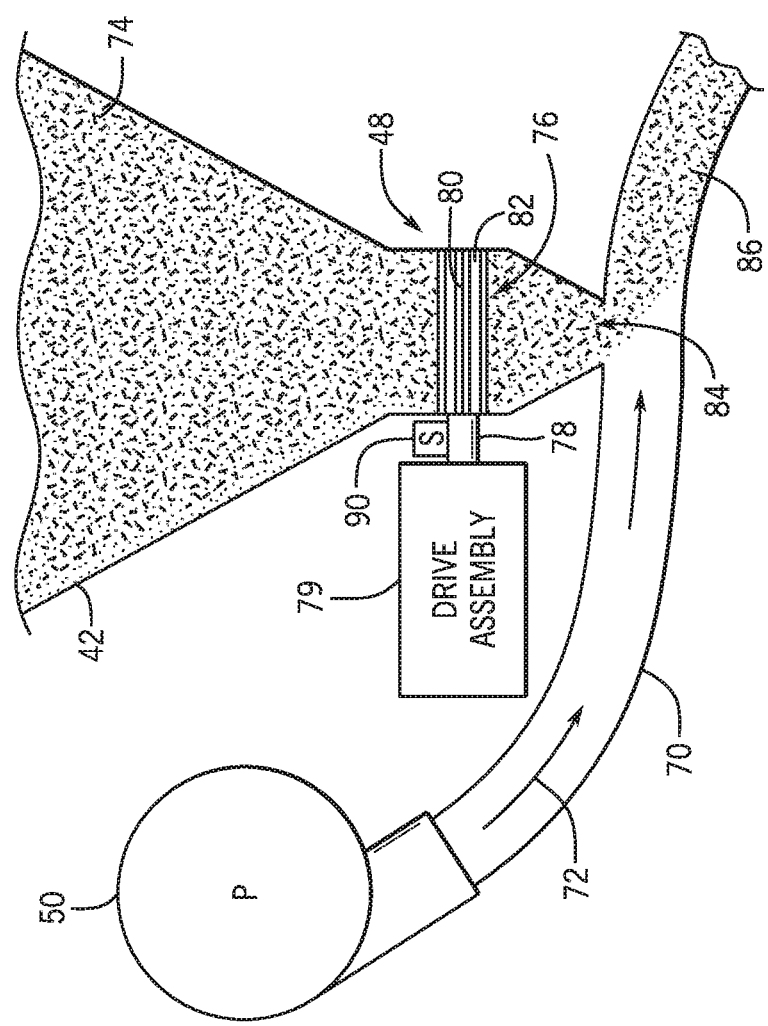
FIG. 3 is a schematic view of an embodiment of a metering system that may be employed within the air cart of FIG. 2, in accordance with an embodiment of the present disclosure.

FIG. 3 is a schematic view of an embodiment of a metering system 48 that may be employed within the air cart of FIG. 2. A product flow system of the air cart may include the air source 50, the metering system 48, and a conduit 70. As illustrated, the air source 50 is coupled to the conduit 70 configured to flow air 72 past the metering system 48. The air source 50 may be a pump or blower (e.g., fan) powered by an electric or hydraulic motor, for example. Flowable product material 74 (e.g., seeds, fertilizer, etc.) within the storage tank 42 flows by gravity into the metering system 48. In certain embodiments, the storage tank 42 is pressurized such that a static pressure in the tank 42 is greater than (or at least equal to) a static pressure in the conduit 70, thereby facilitating an even flow of material through the metering system 48. The metering system 48 includes one or more meter rollers 76 configured to regulate the flow of material 74 into the air flow 72. For example, certain metering systems 48 may include ten meter rollers 48, each disposed within an independent seed meter and each configured to flow product material 74 into a respective conduit 70 for distribution to one or more respective row units of the agricultural implement. Such metering systems are known as "10-run" metering system. However, in alternative embodiments, the metering system 48 may include more or fewer meter rollers (e.g., 5, 6, 7, 8, 9, 11, or more).

As illustrated, the meter roller 76 includes an interior cavity configured to receive a shaft 78 that drives the meter roller 76 to rotate. The shaft 78 is coupled to a drive unit 79, such as an electric or hydraulic motor, configured to rotate the meter roller 76. Alternatively, the meter roller 76 may be coupled to a wheel by a gear assembly such that rotation of the wheel drives the meter roller 76 to rotate. Such a configuration automatically varies the rotation rate of the meter roller 76 based on the speed of the air cart 14.

The meter roller 76 also includes multiple flutes 80 and recesses 82. The number and geometry of the flutes 80 are particularly configured to accommodate the material 74 being distributed. The illustrated meter roller 76 includes six flutes 80 and a corresponding number of recesses 82. Alternative embodiments may include more or fewer flutes 80 and/or recesses 82. For example, the meter roller 76 may include 2, 4, 6, 8, 10, 12, 14, 16, 18, 20, or more flutes 80 and/or recesses 82. In addition, the depth of the recesses 82 and/or the height of the flutes 80 are configured to accommodate the material 74 within the storage tank 42. For example, a meter roller having deeper recesses 82 and fewer flutes 80 may be employed for larger seeds, while a meter roller having shallower recesses 82 and more flutes 80 may be employed for smaller seeds. Other parameters such as flute pitch (i.e., angle of the flute relative to a longitudinal/rotational axis) and flute angle (i.e., angle of the flute relative to a radial axis) may also be particularly selected to accommodate the material 74.

For a particular meter roller configuration, the rotation rate of the meter roller 76 controls the flow of material 74 from the meter roller into the air stream 72. For example, as the meter roller 76 rotates, the meter roller 76 transfers material 74 through an opening 84 in the metering system 48 into a respective conduit 70 (e.g., into a conduit associated with a respective row unit or group of row units). The material then mixes with air from the air source 50, thereby forming an air/material mixture 86. The mixture then flows to the respective row unit(s) of the implement via pneumatic conduits 52, where the seeds and/or fertilizer are deposited within the soil.

The metering system 48 of the air cart 14 includes a meter roller sensor 90 that may be configured to monitor a speed of each meter roller 76 as it rotates. The meter roller sensor 90 may be located on the metering system 48 at any location suitable for monitoring the speed of each meter roller. There may be a meter roller sensor 90 disposed on each meter roller 76 of the metering system 48, or on any suitable number of meter rollers 76 included in the metering system 48. The meter roller sensor 90 may output a signal or signals to the air cart controller 20 indicative of the meter roller 76 rotation speed. The air cart controller 20 may utilize the signal(s) from the meter roller sensor 90 to determine a target product flow rate or other target parameters and/or as feedback into the product distribution control system 12 (e.g., once output signals from the air cart controller 20 have been output to control various components of the agricultural system 10), as discussed in more detail with reference to FIG. 7.

Figure 4:
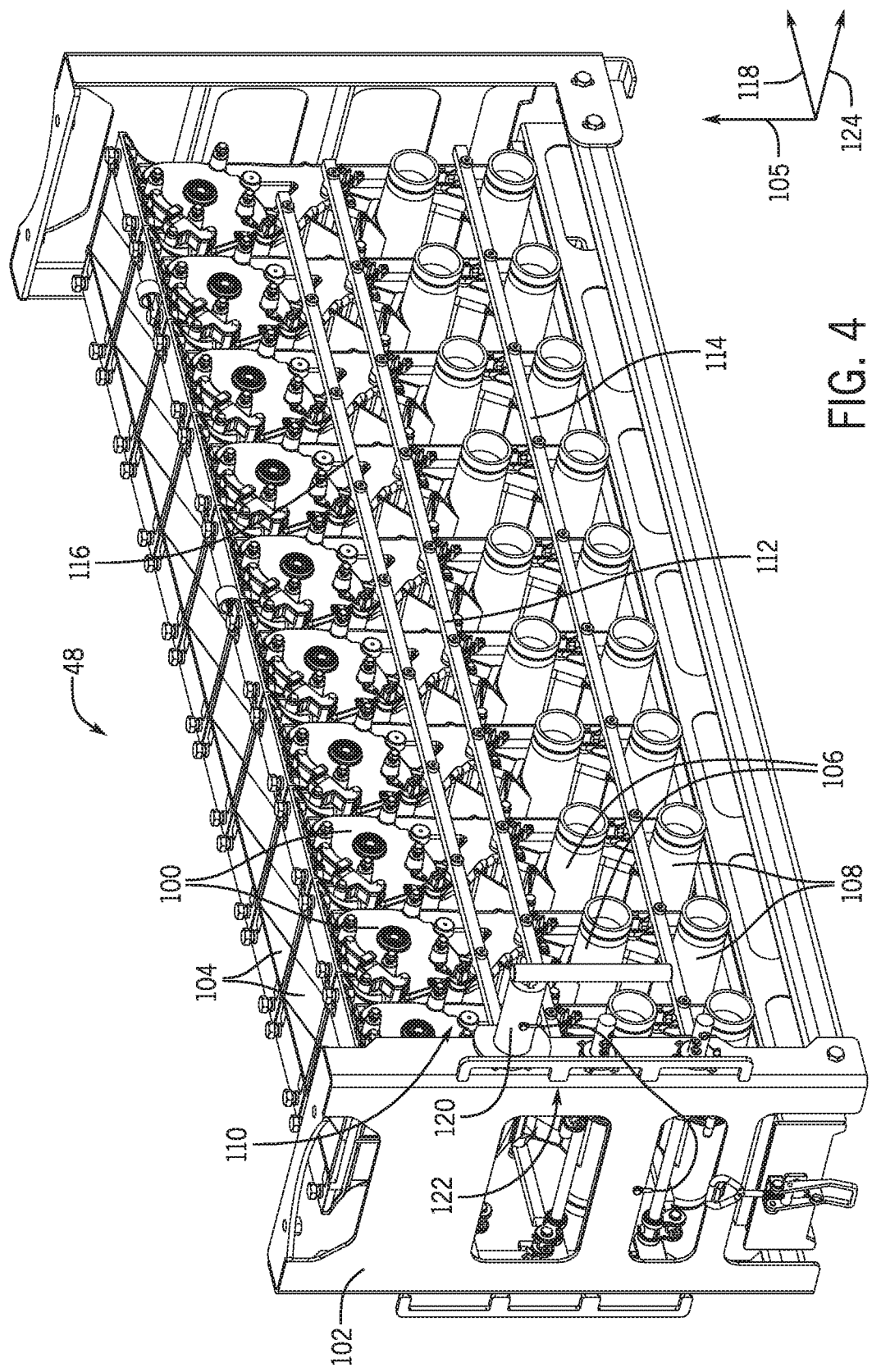
FIG. 4 is a perspective view of an embodiment of a metering system that may be employed within the air cart of FIG. 2, in accordance with an embodiment of the present disclosure.

FIG. 4 is a perspective view of an embodiment of a metering system 48 that may be employed within the air cart of FIG. 2. As illustrated, the metering system 48 includes ten seed meters 100 supported by a frame 102. While the illustrated embodiment includes ten seed meters 100, it should be appreciated that more or fewer seed meters may be employed in alternative embodiments. For example, certain metering systems may include 1, 2, 4, 6, 8, 10, 12, 14, or more seed meters 100. Each seed meter 100 includes at least one respective meter roller 76 to control flow of product material 74 to a respective conduit 70. Each seed meter 100 also includes an inlet 104 configured to receive the product material 74 from the storage tank (e.g., along a vertical axis 105). Furthermore, each seed meter 100 includes a first conduit connector 106 and a second conduit connector 108. Each conduit connector is configured to receive the air flow from the air source 50 and the product material flow from the meter roller 76, thereby producing the air/material mixture 86. First conduits may be coupled to the first conduit connectors 106 and second conduits may be coupled to the second conduit connectors 108. The conduits may be coupled to respective row units and/or distribution headers that provide particular material to multiple row units.

Each seed meter 100 includes gates configured to direct the product material to the first conduit connector 106 or to the second conduit connector 108. For example, a first gate may control flow to the first conduit connector 106 and a second gate may control flow to the second conduit connector 108. The seed meter 100 includes a flow control assembly 110 configured to adjust the position of each gate. As illustrated, the flow control assembly 110 includes a first gate control link, such as the illustrated first gate control rod 112, a second gate control link, such as the illustrated second gate control rod 114, and a third gate control link, such as the illustrated third gate control rod 116. The first gate control rod 112 is coupled to a respective first gate of each seed meter 100. Movement of the first gate control rod 112 along a lateral axis 118 drives each first gate to transition (e.g., move) between an open position that facilitates material flow to the first conduit connector 106 and a closed position that blocks material flow to the first conduit connector 106. In addition, the second gate control rod 114 is coupled to a respective second gate of each seed meter 100. Movement of the second gate control rod 114 along the lateral axis 118 drives each second gate to transition (e.g., move) between an open position that facilitates material flow to the second conduit connector 108 and a closed position that blocks material flow to the second conduit connector 108. Moreover, the third gate control rod 116 is coupled to a respective third gate of each seed meter 100, which is configured to control calibration and clean-out operations. Movement of the third gate control rod 116 along the lateral axis 118 drives each third gate to transition (e.g., move) between an open position and a closed position.

As discussed above, each meter roller 76 of the metering system 48 may be associated with a meter roller sensor configured to monitor the speed of each respective meter roller 76 and to output a signal or signals indicative of the speed of each meter roller 76 to the air cart controller of the product distribution system 12. The product distribution system 12 may further include flow sensor(s) that may be located along the pneumatic conduit(s) that carry the product material from the respective conduit connectors 106 and 108 to the row units of the implement. The flow sensor(s) may be configured to monitor product flow characteristics, such as a product flow rate and/or a product velocity. The flow sensor(s) may be configured to output a signal or signals to the air cart controller indicative of the determined product flow rate and/or product velocity. The air cart controller may utilize the signal(s) from the meter roller sensor(s) and/or the flow sensor(s) to determine a target product flow rate or other target parameters and/or as feedback into the product distribution control system 12 (e.g., once output signals from the air cart controller have been output to control various components of the agricultural system 10), as discussed in more detail with reference to FIG. 7.

Figure 5:
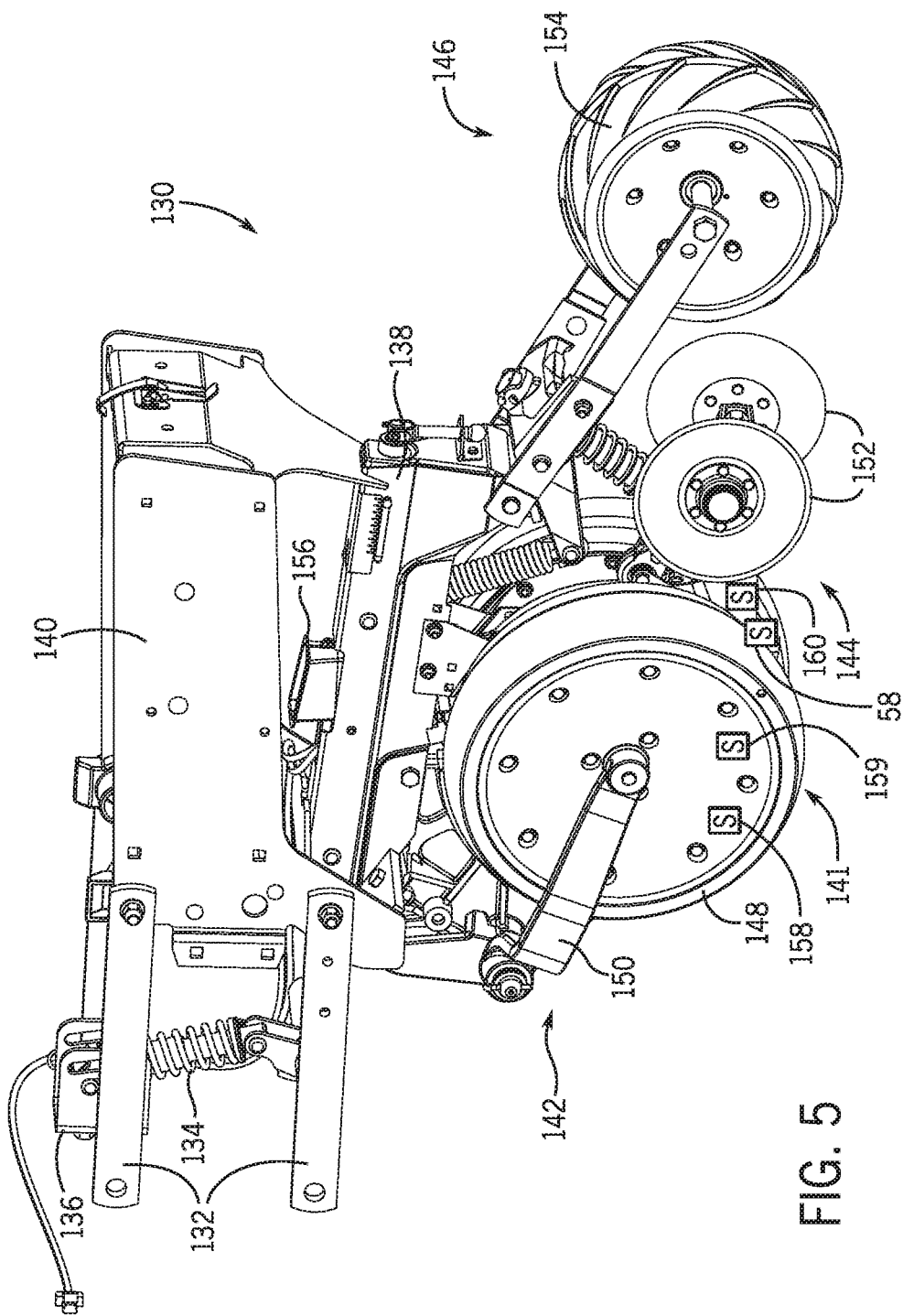
FIG. 5 is a perspective view of an embodiment of a row unit of an agricultural implement that may be used in the agricultural system of FIG. 1, in accordance with an embodiment of the present disclosure.

FIG. 5 is a perspective view of an embodiment of a row unit 130 that may be employed within the agricultural implement 16 of FIG. 1. As illustrated, the row unit 130 includes elements 132 of a parallel linkage assembly, also known as a four bar linkage, configured to couple the row unit 130 to a tool bar of the implement, while enabling vertical movement of the row unit 130. In addition, a biasing member 134 extends between a mounting bracket 136 and a lower portion of the parallel linkage to establish a contact force between the row unit 130 and the soil. In certain configurations, the biasing member 134 is adjustable to vary the contact force based on field conditions. For example, the biasing member 134 may be adjusted to compensate for hard or soft soil conditions. Biasing member 134 may come in the form of a hydraulic cylinder, electric/pneumatic actuator or a combination thereof. The parallel linkage elements 132 are pivotally coupled to a chassis 138 and a frame 140.

Each row unit 130 may have a ground engaging tool configured to form a seeding path for seed deposition into the soil. As illustrated, the chassis 138 supports a coulter assembly 142, a soil closing assembly 144, and a packer assembly 146. In some embodiments, depending on the seeding tool, the chassis may not have a coulter assembly, but rather a knife/hoe assembly. In the present configuration, the coulter assembly 142 includes a gauge wheel 148 coupled to the chassis 138 by a rotatable arm 150. The gauge wheel 148 may be positioned a vertical distance above a coulter disk 141 (e.g., ground engaging tool) to establish a target trench depth for seed deposition into the soil. As the row unit 130 travels across a field, the coulter disk 141 excavates a trench into the soil, and seeds are deposited into the trench. Next, closing disks 152 of the closing assembly 144 push the excavated soil into the trench, and a packer wheel 154 of the packer assembly 146 packs the soil on top of the deposited seeds. This process establishes a row of planted seeds within a field. By employing multiple row units 130 distributed along the tool bar of the implement 16, multiple rows of seeds may be planted within the field. The chassis 138 also supports a seed tube 156 configured to provide seeds from a metering system to the soil. The exit to the seed tube 156 is positioned aft of the coulter disk and forward of the closing disks 152 such that the seeds are deposited into the trench before the trench is closed.

Each row unit 130 of the implement may include one or more sensors that may be disposed at various locations about the row unit 130. The one or more sensors may be configured to monitor various operational parameters related to the operation of the row unit 130 and implement of the agricultural system. For example, as shown in the illustrated embodiment, the row unit 130 includes a ground penetration sensor 158 that may be configured to monitor ground penetration depth of the coulter disk 141 and/or a position of the gauge wheel 148. The ground penetration sensor 158 may be disposed on the coulter disk 141, the gauge wheel 148, or at any location suitable for monitoring ground penetration depth of the coulter disk 141 of the row unit 130. Further, as shown in the illustrated embodiment, the row unit 130 includes a down pressure sensor 159 that may be configured to monitor a position of the gauge wheel(s) 148 the row unit 130. The down pressure sensor 159 may be disposed on the gauge wheel 148, the packer wheel 154, or at any location suitable for monitoring down pressure of the row unit 130. Further, as shown in the illustrated embodiment, the row unit 130 may include a particle counting sensor 160 that may be configured to monitor an amount of product particles passing through, thus an amount of seeds and/or fertilizer being planted in the field. The particle counting sensor 160 may be disposed on the seed tube 156 or at any other location on the row unit 130 suitable for monitoring the particle count. In some embodiments, the soil sensor 58, shown in FIG. 2, may be positioned on the row unit chassis. Depending on the row unit setup (i.e. coulter or knife), the soil sensor 58 may be placed anywhere that good soil contact will occur. The ground penetration sensor 158, the down pressure sensor 159, and/or the particle counting sensor 160 may be configured to output a signal or signals to the air cart controller and/or the implement controller indicative of the ground penetration depth and/or particle count. In some embodiments, the implement controller may relay the signal(s) to the air cart controller. The air cart controller may utilize the signal(s) received from the ground penetration sensor 158, the down pressure sensor 159, the particle counting sensor 160, or any combination thereof as an input to determine a target penetration depth or other target parameters and/or as feedback to the air cart controller, as discussed in more detail with reference to FIG. 7.

Figure 6:
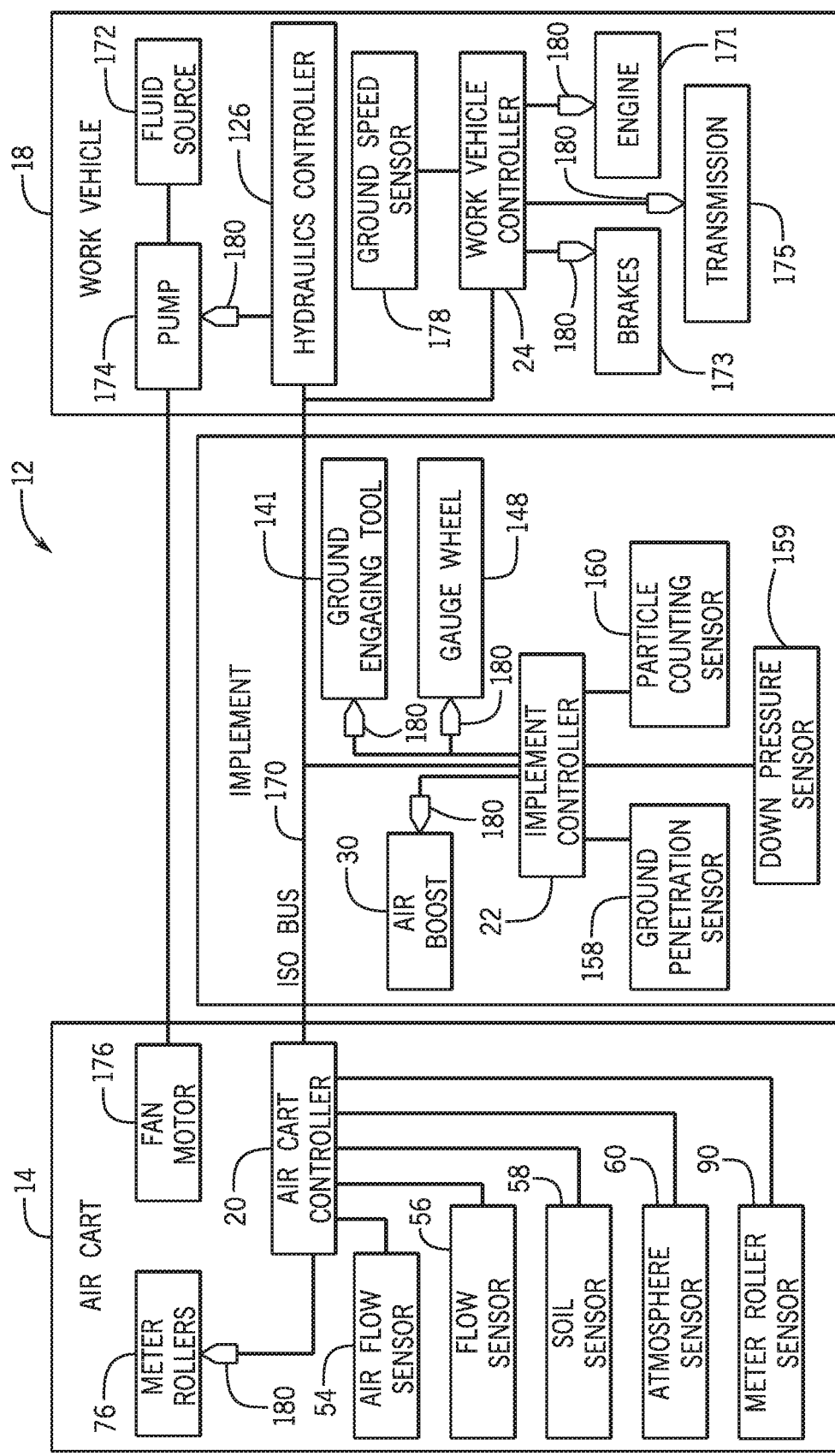
FIG. 6 is a schematic diagram of an embodiment of a product distribution control system that may be used in the agricultural system of FIG. 1, in accordance with an embodiment of the present disclosure.

FIG. 6 is a schematic diagram of an embodiment of a product distribution control system 12 for controlling the product distribution from the agricultural system 10. The product distribution control system 12 includes the various controllers, sensors, and actuators. The product distribution control system 12 includes the air cart controller 20 that is communicatively coupled to and configured to communicate with the implement controller 22, work vehicle controller 24, and the hydraulics controller 26 via an ISOBUS network 170. As previously described, the air cart controller 20 may be the main controller of the product distribution control system 12. The air cart controller 20 may be configured to receive signals from various sensors throughout the agricultural system 10. The air cart controller 20 may also be configured to control a variety of air cart 14 functions, such as the speed of each meter roller 76 and automatic calibration of the meter roller 76. The air cart controller 20 may be configured to control a variety of functions of the implement 16 and the work vehicle 18, to control product distribution from the agricultural system 10. Accordingly, the air cart controller 20 may control of the distribution from the agricultural system from a centralized location while reducing operator input. The air cart 14 may include a variety of sensors, as discussed above, such as the air flow sensor 54, the particle flow sensor 56, the soil sensor 58, the atmosphere sensor 60, and the meter roller sensor 90. These sensors may be communicatively coupled to the air cart controller 20 and may be configured to monitor and output a variety of signals to the air cart controller 20 indicative of measurements related to operation of the air cart 14 and/or the agricultural system 10.

The implement controller 22 is communicatively coupled to the air cart controller 20 via the ISOBUS network 170. The implement controller 22 may be configured to control a variety of implement 16 functions, such as down pressure, penetration depth of the ground engaging tools 141 of the row units 130, and engagement of an air boost 30. The implement 16 may include a variety of sensors, as discussed above, which may be disposed on the row units 130, such as the ground penetration sensor 158 and the particle counting sensor 160. These sensors may be communicatively coupled to the implement controller 22 and/or to the air cart controller 20 and may be configured to monitor and output a variety of signals to the implement controller 22 and/or to the air cart controller 20. In some embodiments, if the ground penetration sensor 158, the down pressure sensor 159, and/or the particle counting sensor 160 output signals to the implement controller 22, the implement controller 22 may output the signals received from the sensors to the air cart controller 20.

The work vehicle 18 includes a work vehicle controller 24 and a hydraulics controller 26. The work vehicle controller 24 and the hydraulics controller 26 are communicatively coupled to the air cart controller 20 via the ISOBUS network 170. The work vehicle controller 24 may be configured to control a variety of work vehicle 18 functions, such as speed of the work vehicle 18, by controlling the engine 171, the brakes 173, or the transmission 175 of the work vehicle 18, or a combination thereof. The hydraulics controller 26 may be configured to control of the flow of hydraulic fluid throughout the agricultural system 10. For example, the hydraulics controller 26 may be configured to adjust fluid flow to various hydraulic actuators on the air cart 14, the implement 16, and/or the work vehicle 18. In the illustrated embodiment, the hydraulics controller 26 may control the flow of hydraulic fluid from a fluid source 172 to a fan motor 176 of the air cart 14 by controlling the output from a hydraulic pump 174, and thus may control the speed of the air source 50 (e.g., fan), as discussed in detail with reference to FIG. 7. The work vehicle 18 may include a variety of sensors, such as a ground speed sensor 178 that may be configured to determine a speed of the work vehicle 18. The ground speed sensor 178 may be communicatively coupled to the work vehicle controller 24 and/or to the air cart controller 20, and may be configured to monitor and output a variety of signals to the work vehicle controller 24 and/or to the air cart controller 20. In some embodiments, if the ground speed sensor 178 outputs signals to the work vehicle controller 24, the work vehicle controller 24 may output the signals to the air cart controller 20.

The air cart controller 20 may be configured to receive signals indicative of operational parameters from the various sensors of the air cart 14, the implement 16, and the work vehicle 18. The air cart controller 20 may receive these signals directly from the sensors and/or from the implement controller 22, the work vehicle controller 24, or they hydraulics controller 26. In some embodiments, the implement controller 16, the work vehicle controller 24, and/or they hydraulics controller 26 may be omitted. Further, in some embodiments, more or fewer sensors may be included in the product distribution control system 12. The air cart controller 20 may utilize the signal(s) received from the sensors as inputs to a target product flow rate, a target speed of the agricultural system, and a target penetration depth and/or as feedback to the air cart controller 20. The air cart controller 20 may be further configured to determine target operational settings based on inputs, such as a prescription map. The air cart controller 20 may be further configured to output instructions to actuators 180 on the air cart 14, the implement 16, and/or the work vehicle 18, instructing the actuators 180 to perform certain operations, such as instructions to reduce the penetration depth of at least one ground engaging tool 141 of the implement 16, reduce the down pressure of the implement 16, increase the speed of each meter roller 76, or increase they hydraulic flow to the air cart 14. The output instruction signals may be directed to various actuators 180 of the air cart 14, and/or the air cart controller 20 may output the output signals to actuators 180 of the implement 16 and/or the work vehicle 18 via the ISOBUS network 170. The received input signals and output instruction signals of the air cart controller 20 are discussed in greater detail with reference to FIG. 7.

Figure 7:
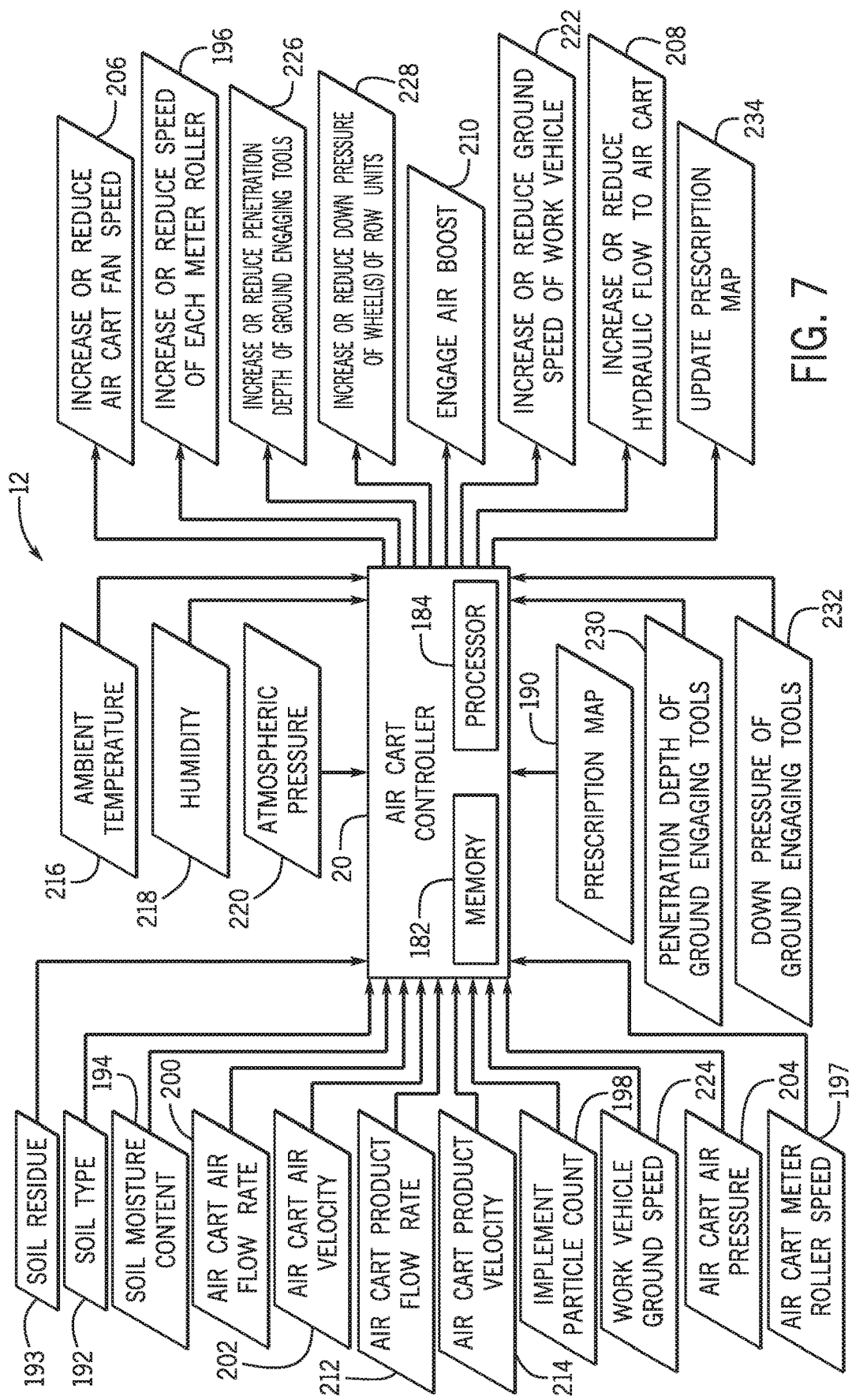
FIG. 7 is a block diagram of an embodiment of a controller that may be employed within the product distribution control system of FIG. 6, in accordance with an embodiment of the present disclosure.

FIG. 7 is a block diagram of an embodiment of a controller that may be employed within the product distribution control system 12 of FIG. 6. The air cart controller 20 may include a memory 182 and a processor 184. In operation, the air cart controller 20 may receive various types of input signals from sensors throughout the agricultural system 10 at the processor 184. In some embodiments, these signals and/or control signals sent by the air cart controller 20 may be saved in the memory 182. The input signals may be utilized in various combinations to determine target operational settings of the agricultural system 10. The air cart controller 20 may then output various instruction signals to various components (e.g., actuators) of the agricultural system 10 to achieve the determined target operational settings. The sensors may further provide feedback to the air cart controller 20 upon output of the instruction signals by the air cart controller 20.

As illustrated, the air cart controller 20 may be the main controller of the product distribution control system 12. The air cart controller 20 may receive a signal 190 indicative of a prescription map. The prescription map may be a desired constant product density of the field, for example 2.5 bushels per acre. The prescription map may be input by a user via a user interface (e.g., as a product density). The air cart controller 20 may receive a signal indicative of soil conditions, such as a signal 192 indicative of a soil type, a signal 193 indicative of a soil residue, and/or a signal 194 indicative of a soil moisture content. In some embodiments, the signals 192, 193, and 194 may be received by the air cart controller 20 from the soil sensor 58 of the air cart 14 or the row unit 130 of implement 16. However, the signal(s) indicative of soil conditions may be received by the air cart controller 20 from other sources, such as a soil condition map created from data collected during a previous pass through the field, a satellite, input of manual soil condition measurements, or a combination thereof.

In certain embodiments, based at least in part on the signal 190 indicative of the prescription map and at least one of the signals 192 and 194 indicative of soil conditions, the air cart controller 20 may determine a target product flow rate from each row unit 130 on the implement 16. The air cart controller 20 may then output an instruction signal to the actuators of the motor(s) that drive the meter roller(s) indicating the product output rate from the air cart 14. This instruction signal may be a signal 196 instructing actuators of the motor(s) that drive the meter roller(s) to increase or reduce the speed of each meter roller 76, thus increasing or reducing the amount of product being sent to the implement 16. As feedback, the air cart controller 20 may receive a signal 197 indicative of the speed of the meter rollers 76, a signal 198 indicative of the particle count of product being deposited by the row units 130 of the implement 16, other signals that may indicate a product flow rate from the air cart 14, or a combination thereof. The signals 197 and 198 may be received by the air cart controller 20 from the meter roller sensor and/or the particle counting sensor.

In certain embodiments, the determination by the air cart controller 20 of the target product flow rate may be based at least in part on a signal 200 indicative of the air flow rate from the air source of air cart, a signal 202 indicative of the air velocity from the air cart, and/or a signal 204 indicative of the air pressure in the conduits to the row units. These signals may be received by the air cart controller 20 from the air flow sensor of the air cart. The air cart controller 20 may then output an instruction signal indicating the target product flow rate. This instruction signal may be a signal 206 instructing the air cart to increase or reduce the fan speed of the air source and/or a signal 208 instructing the hydraulics controller of the work vehicle to increase or reduce the flow of hydraulic fluid to the fan motor, which in turn may increase or reduce the fan speed of the air source, as previously discussed. The output instruction signal may also include a signal 210 instructing the implement controller to engage the air boost to maintain the flow of product particles through the implement (e.g., to dislodge product from clogged or partially clogged conduits). Signals 200, 202, and/or 204 indicative of air flow properties (e.g., from the air flow sensor) may be used as feedback to the air cart controller 20 to facilitate control of the air flow rate and/or the product flow rate. A signal 212 indicative of a product flow rate from the air cart and/or a signal 214 indicative of a product velocity from the air cart may be received by the air cart controller 20 from the flow sensor as feedback to the air cart controller 20 to facilitate control of the product flow rate. In addition, the signals 212 and 214 indicative of product flow characteristics from the air cart may be used as input signals to the air cart controller 20 to facilitate determination of the target air flow rate. In addition, the signals indicative of air flow and product flow properties may be used by the air cart controller 20 to determine a residence time of the product within the product distribution system, this in turn may be used by the air cart controller to determine the target product flow rate and/or a target air flow rate. The signals 200, 202, 204, 212, and 214 may further be used by the air cart controller 20 as an input to determine one or more of the other parameters.

In certain embodiments, the determination by the air cart controller 20 of the target product flow rate and the target air flow rate may be based at least in part on one or more atmosphere conditions, such as a signal 216 indicative of an ambient temperature, a signal 218 indicative of a humidity, a signal 220 indicative of an atmospheric pressure, or a combination thereof. These input signals may be received by the air cart controller 20 from the atmosphere sensor. The air cart controller 20 may then output an instruction signal indicative of an air flow rate from the air cart based on the determined target product flow rate. These characteristics of the atmosphere may affect the air flow from the air cart. Therefore, this instruction signal may be the signal 206 instructing the actuator of the fan motor to increase or reduce the speed of the fan of the air source and/or the signal 208 instructing the hydraulics controller 26 of the work vehicle 18 to increase or reduce the flow of hydraulic fluid to the air cart. As discussed above, signals from the air flow sensor may be used by the air cart controller 20 as feedback to the air cart controller 20 to facilitate control of the air flow rate.

In certain embodiments, based at least in part on the signal 190 indicative of the prescription map and at least one of the signals 192 and 194 indicative of soil conditions, the air cart controller 20 may determine a target speed of the agricultural system 10. The air cart controller 20 may then output an instruction signal to the speed control system of the work vehicle (e.g., the engine, brakes, and transmission) indicating the target speed. This instruction signal may be a signal 222 instructing the actuators of the speed control system of the work vehicle to increase or reduce the ground speed of the work vehicle. As feedback to the air cart controller 20 may receive a signal 224 indicative of the speed of the work vehicle. The signal 224 may be received by the air cart controller 20 from the ground speed sensor of the work vehicle. The signal 224 indicative of the ground speed of the work vehicle may further be used by the air cart controller 20 as an input to determine one or more of the other parameters.

In certain embodiments, based at least in part on the signal 190 indicative of the prescription map and at least one of the signals 192 and 194 indicative of soil conditions, the air cart controller 20 may determine a target penetration depth of the ground engaging tool of the row units on the implement. The air cart controller 20 may then output an instruction signal to the actuator of the ground engaging tool indicating the target penetration depth. This instruction signal may be a signal 226 instructing the actuator of the ground engaging tool to increase or reduce the penetration depth of the ground engaging tools of the row units of the implement. As feedback, the air cart controller 20 may receive a signal 230 indicative of the penetration depth of the ground engaging tool of the row units. The signal 230 may be received by the air cart controller 20 from the ground penetration sensor(s). The signal 230 may further be used by the air cart controller 20 as an input to increase or reduce the penetration depth of the ground engaging tools. Further, the penetration depth of each ground engaging tool may be set individually based on the prescription map, the soil conditions, or a combination thereof.

In certain embodiments, based at least in part on the signal 190 indicative of the prescription map and at least one of the signals 192 and 194 indicative of soil conditions, the air cart controller 20 may determine a target down pressure of the wheel(s) of the row units on the implement. In certain embodiments, the determined target down pressure may further be based at least in part on the signal 230 indicative of the penetration depth of the ground engaging tools 141. The air cart controller 20 may then output an instruction signal to the down pressure actuator(s) indicating the target down pressure. This instruction signal may be a signal 228 instructing the down pressure actuator(s) to increase or reduce the down pressure of the row units. The down pressure for each row unit may be individually set. As feedback, the air cart controller 20 may receive a signal 232 indicative of the down pressure of the wheel(s) of the row units. The signal 232 may be received by the air cart controller 20 from the ground penetration sensor. The signal 232 may further be used by the air cart controller 20 as an input to determine one or more of the other parameters.

As illustrated, the air cart controller 20 may receive various signals from various sensors throughout the agricultural system 10. Any combination of the input signals may be used by the air cart controller 20 to determine target operational settings, such as the target product flow rate, the target speed of the agricultural system, the target penetration depth of the ground engaging tools, the target down pressure of the wheel(s) of the row units, or a combination thereof for elements of the components of the agricultural system. Further, any of the input signals may be used by the air cart controller 20 as feedback from the output instruction signals. Additionally, the air cart controller 20 may use the input signals from the sensors to update the prescription map in the memory 182 of the air cart controller 20 by outputting a signal 234 indicative of the update. Further, the air cart controller 20 may receive signals 192 and 194 indicative of soil conditions of the field and may output a signal to update the soil condition map in the memory 182 based on these signals.

In some embodiments, the air cart controller 20 may receive signals indicative of other operational parameters of the agricultural system 10 and may output signals to various components of the agricultural system 10. For example, the product distribution control system may include one or more sensors on the air cart that may measure levelness of the air cart. Levelness of the air cart may affect the speed at which the product may is expelled by the meter roller. Therefore, the speed of the meter roller may be controlled based on the levelness of the air cart. For example, the speed or rate of the meter roller may be decreased if the air cart is traveling downhill. In some embodiments, the product distribution control system 12 may include a levelness sensor on the implement that may measure levelness of the implement. The levelness of the implement may affect the air pressure needed to move the product through the conduits to the row units of the implement. For example, if the implement if traveling up hill, a higher air pressure may be used to move the product to the row units in a tow-behind (TBH) setup, as shown in FIG. 1. However, in a tow-between (TBT) setup where the cart 14 is hooked directly behind the tractor 18, with the implement 16 is in the rear, then a lower air pressure would be required on uphill travel. In some embodiments, the product distribution control system 12 may include sensors on the implement that may measure pressure drops within the conduits or pneumatic lines of the implement and my provide feedback to the air cart controller 20 to control the air source output. In some embodiments, the product distribution control system 12 may include one or more sensors on the implement that may monitor residue buildup on the ground engaging tools. The air cart controller 20 may output a signal to a user interface indicative of instructions to inform an operator of the residue buildup conditions.

Figure 8:
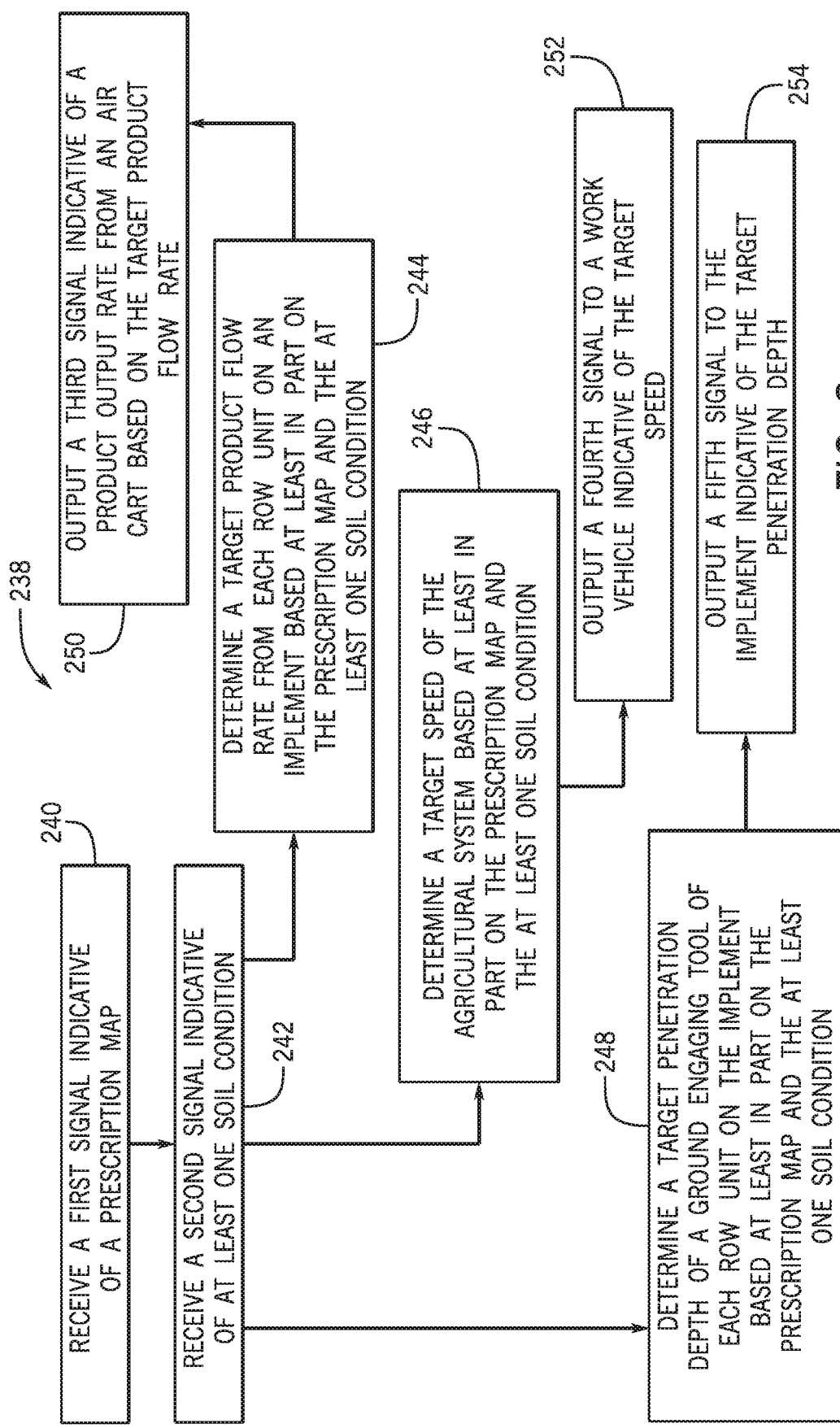
FIG. 8 is a flow diagram of an embodiment of a method for controlling product distribution of the agricultural system of FIG. 1.

FIG. 8 is a flow diagram of an embodiment of a method 238 for controlling product distribution from the agricultural system of FIG. 1. First, as represented by the block 240, a first signal indicative of the prescription map may be received (e.g., by the air cart controller). Additionally, as represented by the block 242, a second signal indicative of at least one soil condition may be received (e.g., by the air cart controller). Based on at least the prescription map and the at least one soil condition, a target product flow rate from each row unit on the implement may be determined (e.g., by the air cart controller) (block 244), a target speed of the agricultural system may be determined (e.g., by the air cart controller) (block 246), and a target penetration depth of a ground engaging tool of each row unit on the implement may be determined (e.g., by the air cart controller) (block 248).

In certain embodiments, the target product flow rate may be determined further based at least in part on air flow characteristics of the air cart 14, such as the air flow rate, the air velocity, and the air pressure, particle flow characteristics of the air cart, such as the product velocity, atmospheric conditions, such as the ambient temperature, the humidity, and the atmospheric pressure, or a combination thereof. Next, as represented by the block 250, a third signal indicative of a product output rate from an air cart based on the target product flow rate may be output (e.g., by the air cart controller). As previously discussed, this output signal may include instructing the meter roller motor(s) to increase or reduce the speed of each meter roller, instructing fan motor to increase or reduce the speed of the fan of the air source, instructing the hydraulics controller 26 of the work vehicle to increase or reduce the flow of hydraulic fluid to fan motor, instruction the implement to engage the air boost, or a combination thereof. Further, the air cart controller may receive a feedback signal upon outputting the signal indicative of a product output rate from the air cart and may readjust the instruction of the output signal or may output a signal containing a different instruction that may achieve the desired product output rate. For example, the air cart controller may output a signal instruction the meter roller motor(s) to increase the speed of each meter roller. The air cart controller may receive a feedback signal indicative of the product output rate for the air cart. If that product output rate does not match the desired product output rate determined based on the target product flow rate, the air cart controller may output a signal instructing the meter roller motor(s) to readjust the speed of each meter roller or the air cart controller may output a signal instructing the fan motor to increase the speed of the fan of the air source. The next time the product output rate from the air cart is desired to be increased, the air cart controller may first use the output signal that achieved the desired product output rate previously. This feedback and readjustment loop may be used by the air cart controller to control any or all operational parameters of the agricultural system.

In certain embodiments, the target speed of the agricultural system may be determined based at least in part on other parameters. Next, as represented by the block 252, the air cart controller 20 may output a fourth signal to the speed control system (e.g., engine, brakes, and transmission) of the work vehicle indicative of the target speed, which may include a signal instructing the speed control system to increase or decrease the ground speed of the work vehicle. In certain embodiments, the target penetration depth of the ground engaging tool of each row unit may be determined based at least in part on the down pressure of the row unit, among other parameters. Next, as represented by the block 254, a fifth signal indicative of the target penetration depth may be output (e.g., from the air cart controller), which may include a signal instructing the actuator of the ground engaging tool to increase or reduce the penetration depth of the ground engaging tool of each row unit on the implement.

In certain embodiments, a target down pressure of a wheel of each row unit on the implement may be determined (e.g., by the air cart controller) based at least in part on the prescription map and the at least one soil condition. In certain embodiments, the target down pressure may be determined based at least in part on the penetration depth of the ground engaging tools. Next, a sixth signal may be output (e.g., from the air cart controller) to the down pressure actuator indicative of the target down pressure, which may include instructing the down pressure actuator to increase or reduce the down pressure of the row unit. In certain embodiments, the air cart controller 20 may output a signal configured to update the prescription map or the soil condition map based on the signal(s) received from the various sensors.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A product distribution control system for an agricultural system, comprising a controller comprising a memory and a processor, wherein the controller is configured to:
  receive a first signal indicative of a prescription map;
  determine a first parameter associated with operation of an air cart of the agricultural system based at least in part on the prescription map;
  determine a second parameter associated with operation of a work vehicle of the agricultural system based at least in part on the prescription map, a third parameter associated with operation of an implement of the agricultural system based at least in part on the prescription map, or a combination thereof, wherein the implement comprises a row unit, the second parameter comprises a target speed of the agricultural system, and the third parameter comprises a target penetration depth of a ground engaging tool of the row unit;
  output, in response to determining the first parameter, a second signal indicative of an instruction to control a first element of the air cart based at least in part on the first parameter;
  output, in response to determining the second parameter, a third signal indicative of an instruction to control a second element of the work vehicle based at least in part on the second parameter, wherein the second element comprises a speed control system of the work vehicle; and
  output, in response to determining the third parameter, a fourth signal indicative of an instruction to control a third element of the implement based at least in part on the third parameter, wherein the third element comprises an actuator configured to control a penetration depth of the ground engaging tool.

2. The product distribution control system of claim 1, comprising a sensor configured to measure at least one soil condition and configured to output a fifth signal indicative of the at least one soil condition to the controller, wherein the controller is configured to receive the fifth signal, and wherein the at least one soil condition comprises a soil type, a soil moisture content, or a combination thereof.

3. The product distribution system of claim 2, wherein the controller is configured to update a soil condition map based at least in part on the at least one soil condition.

4. The product distribution control system of claim 1, comprising a sensor configured to output a fifth signal to the controller indicative of at least one atmosphere condition, wherein the controller is configured to receive the sixth signal indicative of the at least on atmosphere condition and to determine the first parameter based at least in part on the at least one atmosphere condition, a sensor configured to output a seventh signal to the controller indicative of an air flow rate within the air cart, wherein the controller is configured to receive the seventh signal indicative of the flow rate within the air cart and to determine the first parameter based at least in part on the air flow rate within the air cart, or a combination thereof.

5. The product distribution control system of claim 1, wherein the first element comprises a product flow system of the air cart.

6. The product distribution control system of claim 1, wherein the controller is configured to:
   determine a target down pressure of a wheel of each row unit of the one or more row units on the implement based at least in part on the prescription map, at least one soil condition, or a combination thereof; and
   output a sixth signal to the implement indicative of the target down pressure of the wheel of each row unit on the implement.

7. The product distribution control system of claim 1, wherein the first parameter comprises an air flow rate within the air cart or a meter rate of a product flow system of the air cart.

8. The product distribution system of claim 1, comprising a sensor configured to output a fifth signal to the controller indicative of a product flow rate, wherein the controller is configured to receive the sixth signal indicative of the product flow rate and to determine the first parameter based at least in part on the product flow rate.

9. The product distribution system of claim 8, wherein the controller is configured to control a fan speed of an air source of the agricultural system based at least in part on the first parameter.

10. The product distribution system of claim 8, wherein the first parameter comprises a target product flow rate from the air cart.

11. A method of controlling a product distribution system for an agricultural system, comprising:
   receiving a first signal indicative of a prescription map;
   determining a first parameter associated with operation of an air cart of the agricultural system based at least in part on the prescription map;
   determining a second parameter associated with operation of a work vehicle of the agricultural system based at least in part on the prescription map, a third parameter associated with operation of an implement of the agricultural system based at least in part on the prescription map, or a combination thereof, wherein the implement comprises a row unit, the second parameter comprises a target speed of the agricultural system, and the third parameter comprises a target penetration depth of a ground engaging tool of the row unit;
   outputting, in response to determining the first parameter, a second signal indicative an instruction to control a first element of the air cart based at least in part on the first parameter;
   outputting, in response to determining the second parameter, a third signal indicative of an instruction to control a second element of the work vehicle based at least in part on the second parameter, wherein the second element comprises a speed control system of the work vehicle; and
   outputting, in response to determining the third parameter, a fourth signal indicative of an instruction to control a third element of the implement based at least in part on the third parameter, wherein the third element comprises an actuator configured to control a penetration depth of the ground engaging tool.

12. The method of claim 11, wherein the first parameter comprises an air flow rate within the air cart or a meter rate of a product flow system of the air cart.

13. The method of claim 12, comprising:
   determining a target air flow rate within the air cart based at least in part on the prescription map;
   outputting a seventh signal to engage an air boost of the implement when the air flow rate is less than the target air flow rate.

14. The method of claim 11, comprising:
   determining a target down pressure of a wheel of each row unit of the one or more row units on the implement based at least in part on the prescription map, at least one soil condition, or a combination thereof; and
   outputting a fifth signal to the implement indicative of the target down pressure of the wheel of each row unit on the implement.

15. The method of claim 11, comprising:
   receiving a fifth signal from a sensor indicative of at least one atmosphere condition, wherein the first parameter is determined based at least in part on the at least one atmosphere condition.

16. The method of claim 11, comprising:
   adjusting the first element of the air cart based on the second signal;
   receiving feedback based on the adjusting of the first element of the air cart; and
   readjusting the first element of the air cart based at least on the feedback, wherein the first element is a product flow system.

17. A tangible, non-transitory, and computer-readable medium having instructions stored thereon that, when executed by a processor, are configured to cause the processor to:
   receive a first signal indicative of a prescription map;
   determine a first parameter associated with operation of an air cart of the agricultural system based at least in part on the prescription map, wherein the first parameter comprises an air flow rate within the air cart or a meter rate of a product flow system of the air cart;
   determine a second parameter associated with operation of a work vehicle of the agricultural system based at least in part on the prescription map, a third parameter associated with operation of an implement of the agricultural system based at least in part on the prescription map, or a combination thereof, wherein the implement comprises a row unit, the second parameter comprises a target speed of the agricultural system, and the third parameter comprises a target penetration depth of a ground engaging tool of the row unit;
   output, in response to determining the first parameter, a second signal indicative of an instruction to control a first element of the air cart based at least in part on the first parameter;
   output, in response to determining the second parameter, a third signal indicative of an instruction to control a second element of the work vehicle based at least in part on the second parameter, wherein the second element comprises a speed control system of the work vehicle; and
   output, in response to determining the third parameter, a fourth signal indicative of an instruction to control a third element of the implement based at least in part on the third parameter, wherein the third element comprises an actuator configured to control a penetration depth of the ground engaging tool.

18. The tangible, non-transitory, and computer-readable medium of claim 17, wherein the instructions are configured to cause the processor to:
- determine a target down pressure of a wheel of each row unit of the one or more row units on the implement based at least in part on the prescription map, at least one soil condition, or a combination thereof; and
- output a fifth signal to the implement indicative of the target down pressure of the wheel of each row unit on the implement.

19. The tangible, non-transitory, and computer-readable medium of claim 17, wherein the instructions are configured to cause the processor to receive a fifth signal from sensor indicative of an air flow rate of the air cart, wherein the first parameter is determined based at least in part on the air flow rate of the air cart.

20. The tangible, non-transitory, and computer-readable medium of claim 17, wherein the instructions are configured to cause the processor to receive a fifth signal from a first sensor indicative of at least one soil condition, a sixth signal from a second sensor indicative of at least one atmosphere condition, or a combination thereof, wherein the first parameter is based at least in part on the at least one soil condition, the at least one atmosphere condition, or a combination thereof.

* * * * *